United States Patent
Woley et al.

(10) Patent No.: US 9,209,993 B2
(45) Date of Patent: Dec. 8, 2015

(54) COOPERATIVE SESSION-BASED FILTERING

(75) Inventors: Kevin Michael Woley, Seattle, WA (US); Gaurav S. Anand, Seattle, WA (US); Rajeev Dutt, Redmond, WA (US); Matthew R. Ayers, Seattle, WA (US); Darren Louie, Bellevue, WA (US); George Joy, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 541 days.

(21) Appl. No.: 12/947,419

(22) Filed: Nov. 16, 2010

(65) Prior Publication Data
US 2012/0124144 A1    May 17, 2012

(51) Int. Cl.
*H04L 12/58* (2006.01)
*H04M 3/436* (2006.01)
*H04L 29/08* (2006.01)

(52) U.S. Cl.
CPC .............. *H04L 12/585* (2013.01); *H04L 51/12* (2013.01); *H04L 67/142* (2013.01); *H04M 3/436* (2013.01)

(58) Field of Classification Search
CPC .......... H04B 3/23; H04B 3/231; H04B 3/234; H04B 3/235; H04B 3/238; H04B 7/2048; H04W 72/005; H04W 4/06; H04W 8/26; H04L 12/185; H04L 12/189; H04L 29/06; H04L 29/08072; H04L 29/0809; H04L 29/08117; H04L 29/06047; H04L 29/06095; H04L 29/08576; H04L 12/58; H04L 12/585; H04L 12/581; H04L 12/5855; H04L 1/0026; H04L 1/0003; H04L 12/5895; H04L 41/0893; H04L 43/16; H04L 43/0888; H04L 51/12; H04L 67/02; H04L 67/14; H04L 67/322; H04J 1/05; H04J 1/08; H04J 1/12; H04J 1/045; H04J 3/0638; H04J 3/0682; H04M 11/062; G06Q 30/02; G06Q 10/107; H04N 7/50; H04N 7/5033; H04N 7/5046; H04N 7/26164; H04N 7/26244; H04N 7/26271; H04N 7/26186; G06T 3/40

USPC .......... 709/206, 203, 207, 219, 227; 370/290, 370/312, 497; 375/358, E7.155, E7.159
See application file for complete search history.

(56) References Cited

U.S. PATENT DOCUMENTS

| | | | |
|---|---|---|---|
| 7,293,038 | B2 | 11/2007 | Blevins et al. |
| 7,370,071 | B2 | 5/2008 | Greschler et al. |

(Continued)

FOREIGN PATENT DOCUMENTS

| | | |
|---|---|---|
| CN | 1470999 | 1/2004 |
| CN | 101127744 | 2/2008 |

OTHER PUBLICATIONS

"Microsoft Exchange Server Intelligent Message Filter v2 Operations Guide", Retrieved at <<http://download.microsoft.com/download/a/9/1/a91c80b3-f4762-4b32-8d2c-8cf74056b735/IMF_SP2.doc>>, Feb. 7, 2007, pp. 42.

(Continued)

*Primary Examiner* — Alpus H Hsu
*Assistant Examiner* — Dharmesh Patel
(74) *Attorney, Agent, or Firm* — Bryan Webster; Kate Drakos; Micky Minhas

(57) ABSTRACT

Various embodiments provide session-based filtering to filter messages in a cooperative manner between a client and a service provider. In at least some embodiments, a service provider can establish a messaging session with a client and deliver messages to the client. The client can implement various client-side techniques to filter some of the messages based on various client designated criteria. The service provider can obtain feedback from the client indicative of one or more of the delivered messages that have been filtered. The service provider can dynamically create a session-based list based on the feedback and use the list during the session to block messages on the server-side according to the client designated criteria. When the session concludes, the session-based list can be discarded. In this manner, message filtering can occur without persistent storage of state data for the filtering at the service provider.

20 Claims, 6 Drawing Sheets

(56) References Cited

U.S. PATENT DOCUMENTS

| | | | |
|---|---|---|---|
| 7,613,777 B2 | 11/2009 | Giles et al. | |
| 2004/0167964 A1* | 8/2004 | Rounthwaite et al. | 709/206 |
| 2005/0144279 A1* | 6/2005 | Wexelblat | 709/225 |
| 2005/0198173 A1* | 9/2005 | Evans | 709/206 |
| 2006/0036690 A1 | 2/2006 | O'Neil | |
| 2006/0053203 A1* | 3/2006 | Mijatovic | 709/206 |
| 2009/0017790 A1 | 1/2009 | Thalapaneni et al. | |
| 2009/0122794 A1 | 5/2009 | Wu et al. | |
| 2009/0132579 A1* | 5/2009 | Kwang | 707/102 |
| 2009/0141023 A1* | 6/2009 | Shuster | 345/419 |

OTHER PUBLICATIONS

"Transport and Message Flow Features of Exchange Server 2003", Retrieved at <<http://technet.microsoft.com/en-us/library/aa995825%28EXCHG.65%29.aspx >>, Retrieved Date : Sep. 24, 2010, pp. 16.

"How to Configure Connection Filtering to use Realtime Block Lists (RBLs) and how to Configure Recipient Filtering in Exchange 2003", Retrieved at <<http://support.microsoft.com/kb/823866 >>, Retrieved Date : Sep. 24, 2010, pp. 7.

"MAC Address Limiting on Service Instances and Bridge Domains", Retrieved at <<http://www.cisco.com/en/US/docs/ios/cether/configuration/guide/ce_mac-addlmt-bdsin.html >>, Retrieved Date : Sep. 24, 2010, pp. 21.

"Foreign Office Action", CN Application No. 201110362997.1, Jul. 14, 2014, 17 Pages.

"Foreign Office Action", CN Application No. 201110362997.1, Nov. 5, 2013, 13 pages.

* cited by examiner

COOPERATIVE SESSION-BASED FILTERING

BACKGROUND

In a client-server environment where a service provider implements a messaging service on the server-side to deliver messages to clients, the messaging service is often configured to filter some messages on the server-side based upon various filter criteria. In some traditional approaches, the filtering can be based on filter related state data such as deny lists, block lists, filter criteria, and/or other state data that is maintained persistently by a service provider on the server-side for numerous clients.

Maintaining state data for numerous clients, though, can be expensive because resources (e.g., memory and processing capacity) that could otherwise be enlisted by the service provider for other purposes are tied up for storage and management of the state data. Moreover, it is inefficient and wasteful to persistently store state data at the service provider for clients that may connect infrequently and/or may connect one time and then never reconnect again.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide session-based filtering designed to implement message filtering in a cooperative manner between a client and a service provider. In at least some embodiments, a service provider can establish a messaging session with a client and deliver messages to the client. The client can implement various client-side filtering techniques to filter some of the messages based on the sender, content, a risk factor, and/or other client designated filtering criteria. The service provider can obtain feedback from the client indicative of one or more of the delivered messages that have been filtered at the client according to the client designated criteria. The service provider can dynamically create a session-based list for the client based on the feedback and use the list for the duration of the session to filter messages on the server-side with the client designated criteria. When the session concludes, the session-based list can be discarded to avoid costs associated with storing and maintaining filter criteria for clients at the service provider. In this manner, message filtering can occur without persistent storage of filtering state data at the service provider.

BRIEF DESCRIPTION OF THE DRAWINGS

The same numbers are used throughout the drawings to reference like features.

DETAILED DESCRIPTION

Overview

Various embodiments provide session-based filtering designed to implement message filtering in a cooperative manner between a client and a service provider. In at least some embodiments, a service provider can establish a session for messaging with a client and deliver messages to the client. The client can implement various client-side filtering techniques to filter some of the messages based on the sender, content, a risk factor, and/or other client designated filtering criteria. The service provider can obtain feedback from the client indicative of one or more of the delivered messages that have been filtered at the client according to the client designated criteria. The service provider can dynamically create a session-based list for the client based on the feedback and use the list for the duration of the session to filter messages on the server-side with the client designated criteria. When the session concludes, the session-based list can be discarded to avoid costs associated with storing and maintaining filter criteria for clients at the service provider. In this manner, message filtering can occur without persistent storage of filtering state data at the service provider.

In the discussion that follows, a section entitled "Operating Environment" is provided and describes one environment in which one or more embodiments can be employed. Following this, a section entitled "Session-Based Filtering Examples" describes example interactions that can occur for session-based filtering in accordance with one or more embodiments. Next, a section entitled "Example Methods" describes example techniques for session-based filtering in accordance with one or more embodiments. Last, a section entitled "Example System" describes an example computing systems and devices that can be utilized to implement one or more embodiments.

Operating Environment

Figure 1:
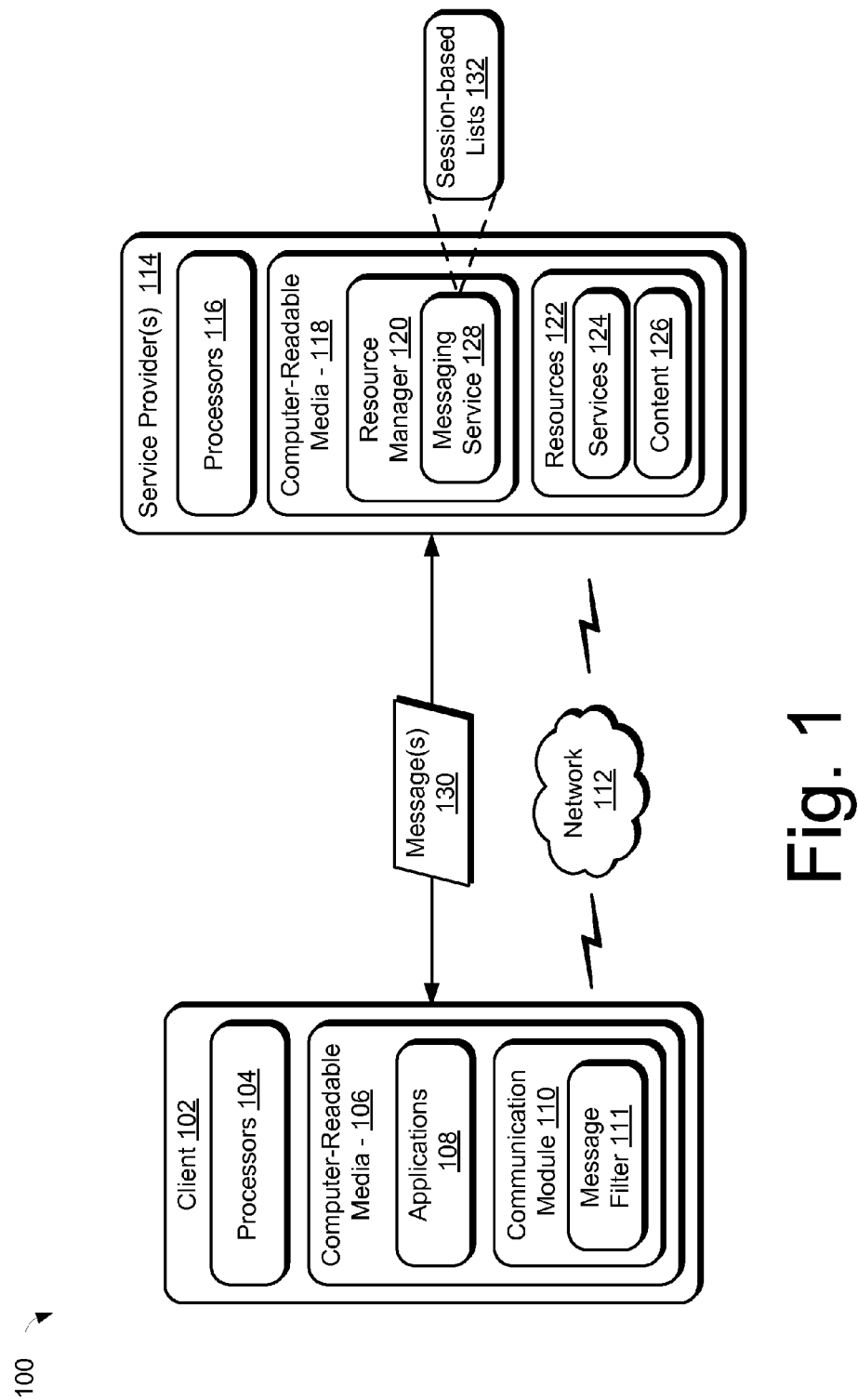
FIG. 1 illustrates an operating environment in which various principles described herein can be employed in accordance with one or more embodiments.

FIG. 1 illustrates an operating environment in accordance with one or more embodiments, generally at 100. Environment 100 includes a client 102 having one or more processors 104, one or more computer-readable media 106 and one or more applications 108 that reside on the computer-readable media and which are executable by the processor(s). The client 102 can be embodied as any suitable computing system and/or device such as, by way of example and not limitation, a desktop computer, a portable computer, a handheld computer such as a personal digital assistant (PDA), a cell phone, a set-top box, and the like. One example of a computing system that can represent various systems and/or devices including the client 102 is shown and described below in FIG. 6.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both computer-readable storage media and communication media, examples of which can be found in the discussion of the example computing system of FIG. 6.

In addition, client 102 includes a software application in the form of a communication module 110 that includes or otherwise makes use of a message filter 111 that operates as described above and below. The communication module 110 represents functionality of the client 102 operable to communicate with and interact with various other entities (e.g., other clients, providers, servers, web sites). Interactions with other entities can include sending and receiving electronic messages in various forms (e.g., e-mail, instant messages, application specific notifications, text messages, and so forth) between the entities.

In this context, the message filter 111 represents functionality of the client 102 operable to perform filtering of messages using any suitable technique. For example, the message filter 111 can be implemented to selectively allow or block messages from various entities based on state data that is maintained by the client. To do so, the message filter 111 can include or make use of an allow list and/or a block list to determine whether to allow or block particular messages and/or senders. Message filtering can also occur at the client in other ways, such as according to sender reputations, a risk rating assigned to a message, and/or content based filtering, to name a few examples.

The client 102 can be communicatively coupled over a network 112, such as the Internet, with one or more service providers 114 from and to which content including various messages can be received and sent, as described above and below. The service providers 114 are each depicted as having one or more processors 116 and one or more computer-readable media 118.

Service provider 114 is depicted as including a resource manager 120. The resource manager 120 represents functionality operable by a service provider 114 to manage various resources 122 that may be made available over the network 112. For example, various resources 122 can be provided via web pages or other user interfaces that are communicated over the network for output by the client 102. The resource manager 120 can manage access to the resources 122, performance of the resources 122, configuration of user interfaces or data to provide the resources 122, and so on.

As illustrated, resources 122 made accessible by a service provider 114 can include one or more services 124 and/or content 126. A service provider 114 can provide one or more web servers and/or sites, which a client 102 can navigate to in order to access the resources 122. The resources 122 can include any suitable combination of services 124 and/or content 126 typically made available over a network by one or more providers. Some examples of services 124 include, but are not limited to, a search service, an email service to send and receive email, an instant messaging service to provide instant messages between clients 102, and a social networking service to facilitate connections and interactions between groups of users who share common interests and activities. Additional examples of services 124 include a shopping service, a weblog service, productivity service, an authentication service, a news service, and an advertisement service to name a few. Content 126 may include various combinations of text, video, ads, audio, multi-media streams, animations, images, web pages, web applications, device applications, content for display by a browser or other device application, and the like.

In addition, the resource manager 120 can include or otherwise make use of a messaging service 128 that is representative of functionality operable to manage communication of messages 130 between the client 102 and other entities. The messaging service 128 can be operated alone and/or in conjunction with other services 124 to provide functionality for one or more different types of messaging. By way of example and not limitation, the multiple different types of messaging provided by the messaging service can include email, text messages, application and/or operating system notifications, social networking notices and invites, instant messaging, voice messages, peer-to-peer messaging, and so forth. The messaging service 128 can also be configured to perform server-side message filtering in various ways to control spam messages, malicious messages, and/or other undesirable messages before they reach the client 102. In at least some embodiments, messaging service 128 is configured to dynamically create and make use of session-based lists 132 to filter and control messages, as described above and below. Session-based lists 132 are configured to describe client designated filtering criteria that can be used to filter messages on the server-side. To avoid costs associated with storing and maintaining session-based lists 132 for multiple clients at the service provider 114, the messaging service 128 can be configured to discard the session-based lists 132 when a corresponding session is completed. A different session-based list 132 can be created, used, and then discarded for each individual session with a client. In other words, session-based lists can be created dynamically "on demand" for each individual session and are not necessarily stored persistently by the service provider 114.

Having described an example operating environment, consider now a discussion of some session-based filtering examples in accordance with one or more embodiments.

Session-Based Filtering Examples

In one or more embodiments, session-based filtering can be implemented to filter messages in a cooperative manner between a client and service provider. By so doing, the service provider does not have to persistently store state data for the filtering, such as filter lists and/or other filter criteria. Instead, the service provider can dynamically create session-based lists that are used for a particular session with a client and then discarded. This enables the provider to avoid costs associated with storing state data that may be used infrequently or not at all by some clients.

In this context, consider the following session-based filtering examples that are described in relation to interactions between a service provider 114 and a client 102 to filter messages in one or more embodiments. These interactions are represented as various example acts that can occur to implement session-based filtering and that are designated using different letters.

Figure 2:
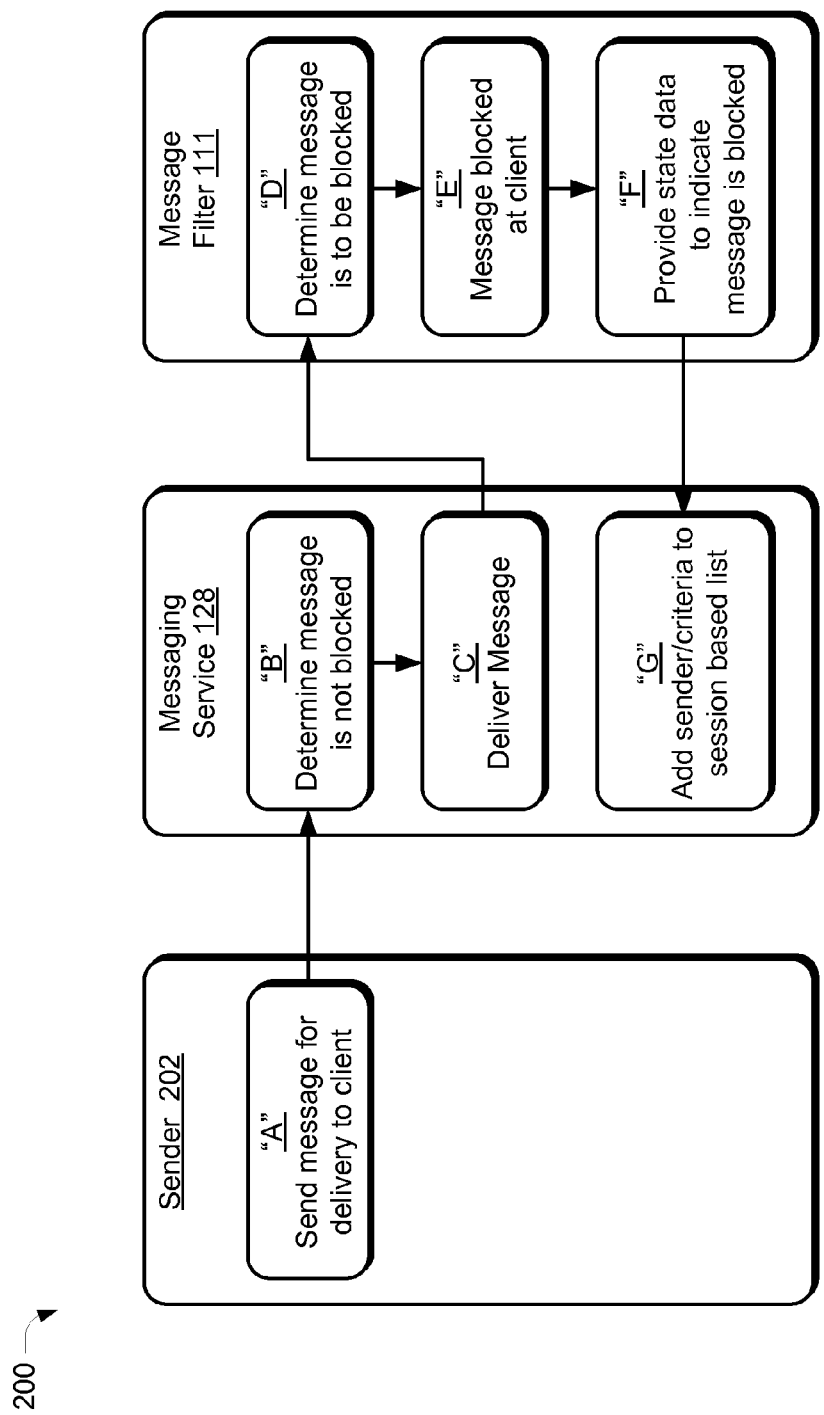
FIG. 2 illustrates example interactions to add a sender to a session-based list in accordance with one or more embodiments.

In particular, FIG. 2 depicts a diagram 200 in which a sender is added to a session-based list. A sender 202 can send a message for delivery to a client (Act A). The message can be configured in various ways as discussed previously and can include metadata or identifiers to identify the sender and/or describe characteristics of the message.

The message can be received via a messaging service 128 of service provider 114, which processes the message. For instance, the messaging service 128 can determine whether a particular message or sender should be blocked. This can occur by determining whether a sender, URL, or domain associated with the message is designated to be blocked. This can also occur by determining whether the message matches or otherwise satisfies other designated filtering criteria established by individual clients, by the service provider, by a community of users (e.g., reputations), or otherwise. Filtering criteria can be established to filter messages based on various reasons, including but not limited to content of a message, message categories, keywords, subject line triggers, risk ratings, reputations, sender ids, and so forth.

As noted, the service provider can be configured such that the service provider does not have to persistently store state data used for filtering. Accordingly, a session-based list 132 for a particular client and session can be created some time after a session has begun and is not initially available for the session. Thus, initially, before a session-based list is created, the messaging service 128 can be configured to deliver messages to the client without performing server-side filtering. Instead, filtering is initially left to be performed on the client-side by the client. In other words, messages can be "passed-through" to the clients before feedback to filter messages is gathered from the clients.

During a session, the messaging service 128 can gather feedback from a client that indicates messages that have been allowed/blocked by the client and corresponding reasons, e.g., filtering criteria that is designated by and applied at the client. Using such feedback, the messaging service 128 can create a session-based list 132 that is employed for the remainder of the session to make determinations and filter messages at the server based on the filter criteria applied previously at the client during the session.

Accordingly, as represented in the example of FIG. 2, the messaging service 128 can determine that the message received from the sender 202 is not blocked (Act B). This can occur initially before a session-based list has been created. Once a session-based list has been established, the determination can occur when the session-based list is applied to the message, but does not cause the message to be blocked. If the message is not blocked, messaging service 128 delivers the message to the client (Act C).

Message filtering can then occur on the client-side in any suitable way. For instance, a message filter 111 of a client can be implemented to apply various filtering criteria to the message received at the client. In the depicted example, the message filter 111 determines that the message from the sender 202 is to be blocked (Act D). This determination can be based on the sender ID and/or other filter criteria established and applied by the client. The message filter 111 can make use of filter lists (block and/or allow), a risk or reputation rating system, content-based filtering, and/or other typical client-side message filtering techniques. Based on the filtering applied at the client, the message is blocked at the client (Act E). For example, the message filter 111 can determine that the sender 202 is on a block list, or is otherwise untrustworthy, and block the message based on the identity of the sender. The message filter 111 could also determine to block the message based on content, keywords, or other criteria. In this case, the message can be discarded, quarantined, moved into a filter folder (e.g., a blocked or "junk" message folder), or otherwise be processed as a blocked message.

In addition, the message filter can be configured to provide feedback in the form of state data that indicates to the service provider that the message was blocked at the client (Act F). State data regarding messages can indicate which messages are blocked and/or allowed at the client. The state data also includes information that describes the filtering techniques and criteria applied at the client. This enables the messaging service 128 to create a session-based list that recreates the filtering employed by the client.

Accordingly, in response to feedback provided by the message filter 111, messaging service 128 adds the sender 202 and/or filtering criteria used by the client to a session-based list (Act G). This can involve creating the session-based list when a list does not already exist and/or adding new entries/data to an existing list. In at least some embodiments, the session-based list can be configured as a block list that indicates senders to block and/or criteria used to block particular messages. In this instance, the sender 202 that is determined to be untrustworthy by the client can be added to the block list. Additionally or alternatively, the message filter 111 can be configured to employ an allow list that indicates senders to allow and/or criteria used to allow particular messages.

Once a session-based list has been established, the session-based list 132 can be applied for the remainder of a session to perform server-side filtering. An example of employing a session-based list 132 for server-side filtering is depicted in FIG. 3.

Figure 3:
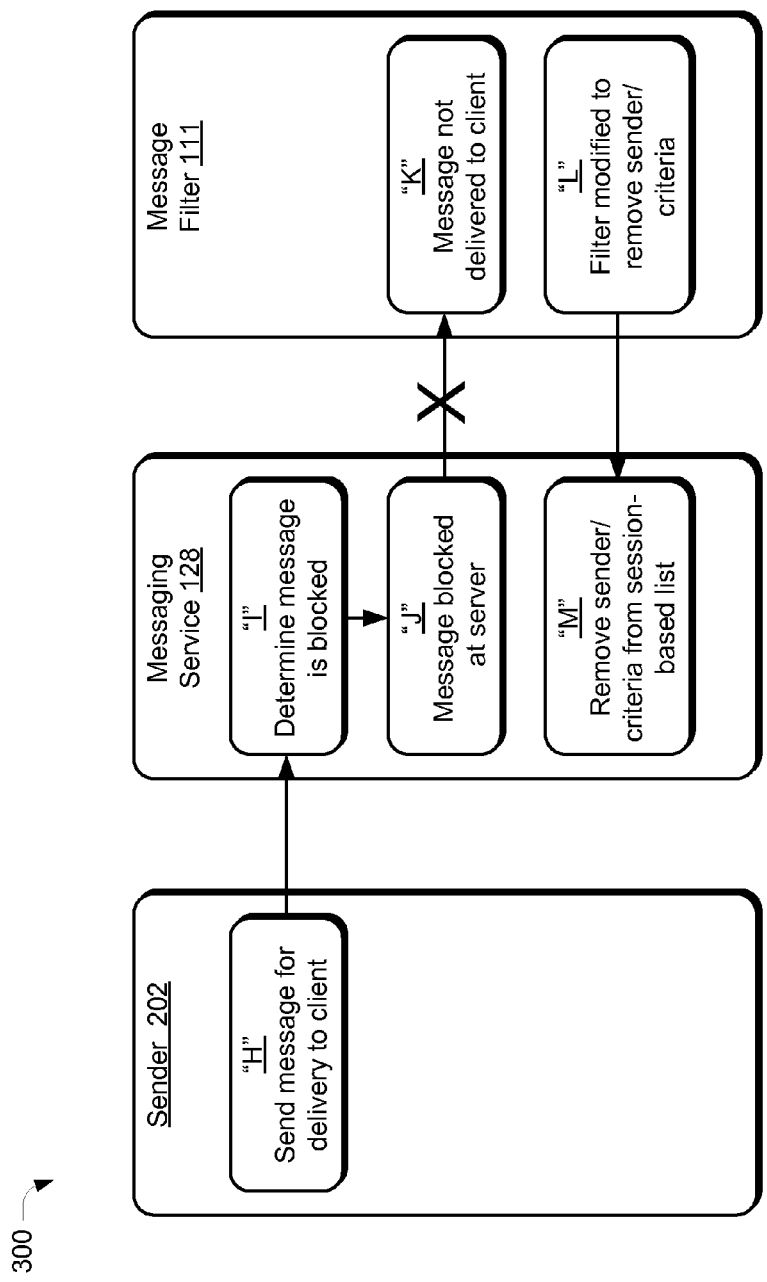
FIG. 3 illustrates example interactions to block a sender based on a session-based list in accordance with one or more embodiments.

In particular, FIG. 3 represents example acts that can occur to block a message from a sender 202 at the server. The acts depicted in FIG. 3 can occur following creation of a session-based list as discussed in relation to the example interaction illustrated in FIG. 2. The sender 202 can again send a message for delivery to a client (Act H). The messaging service 128 can process the message and determine that the message is to be blocked (Act I). In response to this determination, the messaging service blocks the message at the server (Act J) and accordingly, the message is not delivered to the client (Act K).

For example, the messaging service 128 can reference a session-based list 132 corresponding to the client that is created as described herein and determine that messages from the sender 202 are to be blocked. In another example, filtering criteria from the session-based list, such as content or keyword restrictions can be applied to the message, which causes the message to be blocked. As discussed, session-based lists for use on the server-side can be dynamically created during a session based on filtering criteria applied on the client-side during the same session. In this way, session-based lists can be employed to implement filtering criteria applied at the client earlier during the session to messages received at the server later in the session.

At some point during a session, the message filter 111 may be modified to remove or otherwise change filtering criteria that caused the message and/or sender 202 to be blocked (Act L). For example, a user may decide to make changes to the message filter 111 on the client-side to unblock a sender that was previously blocked during a session. In response to these modifications, the message filter 111 may be configured to send state data to the messaging service 128 that in this case describes the changes made to modify the message filter 111. At the messaging service 128, the changes made at the client 102 may be applied to remove the sender 202 and/or filter criteria from the corresponding session-based list 132 (Act M). In this manner, the client 102 has the ability to subsequently modify a session-based list 132 during a session by making changes to the message filter 111 on the client-side that cause the session-based list 132 to be updated on the server-side.

Having considered some examples of session-based filtering, consider now example procedures for session-based filtering in accordance with one or more embodiments.

Example Methods

Figure 4:
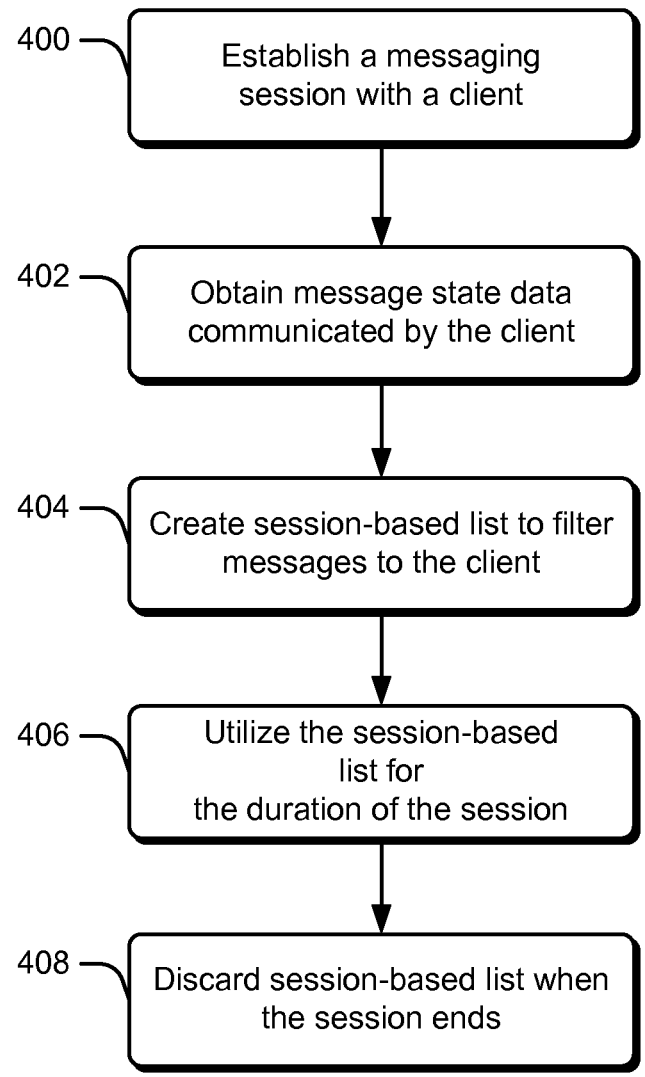
FIG. 4 is a flow diagram that describes steps of a method in accordance with one or more embodiments.

FIG. 4 is a flow diagram that describes steps of a method in accordance with one or more embodiments. The method can be implemented in connection with any suitable hardware, software, firmware, or combination thereof. In at least some embodiments, the method can be implemented by way of a suitability configured computing device, such as the example service provider 114 of FIG. 1 that includes or otherwise makes use of messaging service 128 and/or session-based lists 132.

Step 400 establishes a messaging session with a client. For example, a client 102 can log-in to an account with a service provider 114 that makes various resources 122 available to client over a network 112. Resources 122 can include a messaging service 128 configured to enable the client to send and receive messages 130 in various forms, such as email, instant messages, and other messages as described above and below.

Step 402 obtains message state data communicated by the client. For example, a client can communicate state data as messages that are received and processed by the client during the session. The state data is configured to indicate filtering decisions for messages that are made by the client (e.g., allow or block) as well as filtering criteria used for the decisions. In at least some embodiments, the client can also be configured to provide at least some state data initially when the session is established. For example, the client can communicate an initial block list describing blocking criteria and/or a group of blocked senders at the time the session is established and/or before messages are communicated to and from the client.

Step 404 creates a session-based list to filter messages to the client. The session-based list can be created using the state data that is communicated by the client. The session-based list is configured to recreate the filtering criteria that is applied by the client and described by the state data. For example, if a particular sender or domain is blocked by the client, state data provided by the client will indicate that the sender or domain was blocked, and the session-based list will be configured accordingly to block the sender or domain. Likewise, any filtering criteria used by the client can be incorporated into the session-based list.

Once the list is created, step 406 utilizes the session-based list for the duration of the session. In particular, message filtering can occur on the server-side using the session-based list. As additional messages are sent to the client and processed, the session-based list can be updated to incorporate additional state data communicated by the client. In this manner, state data that is generated and communicated by the client during the session can be used to implement server-side filtering that recreates the filter criteria applied at the client. For a given session, the task of filtering is initially placed upon the client. Once particular senders or criteria for filtering are established for the session, the server takes over filtering of subsequent messages from blocked senders or based on particular criteria by applying the session-based list. To state this another way, session-based lists can be created and used on the server side to selectively block or allow particular messages in accordance with the feedback obtained from a client describing the senders and/or types of messages or content that were blocked or allowed at the client-side during a messaging session.

Step 408 discards the session-based list when the session ends. For example, the list can be discarded when the client logs out or otherwise closes out the session. If the client initiates a subsequent session, the process just described can be repeated for the subsequent session. This can involve starting again without having and/or using persistently stored state data at the server. Instead, another session-based list for use during the subsequent session can be created as state data is generated and communicated by the client during the subsequent session. Discarding the session-based list after each session releases resources that are used to store and manage state data. Effectively, the server-side filtering criteria are reset after each session. From the server-side perspective, a sender or message type that is "blocked" becomes "unblocked" when the session-based list that defines the blocking is discarded. Thus, during each individual session, a first message from a particular sender or of a certain message type (e.g., a message matching particular filtering criteria) is delivered to the client. Thereafter, feedback from a client within a particular session is used to filter subsequent messages on the server-side. In this manner, a cooperative approach to filtering can be employed that takes advantage of resources available from both clients and service providers without overburdening either.

Figure 5:
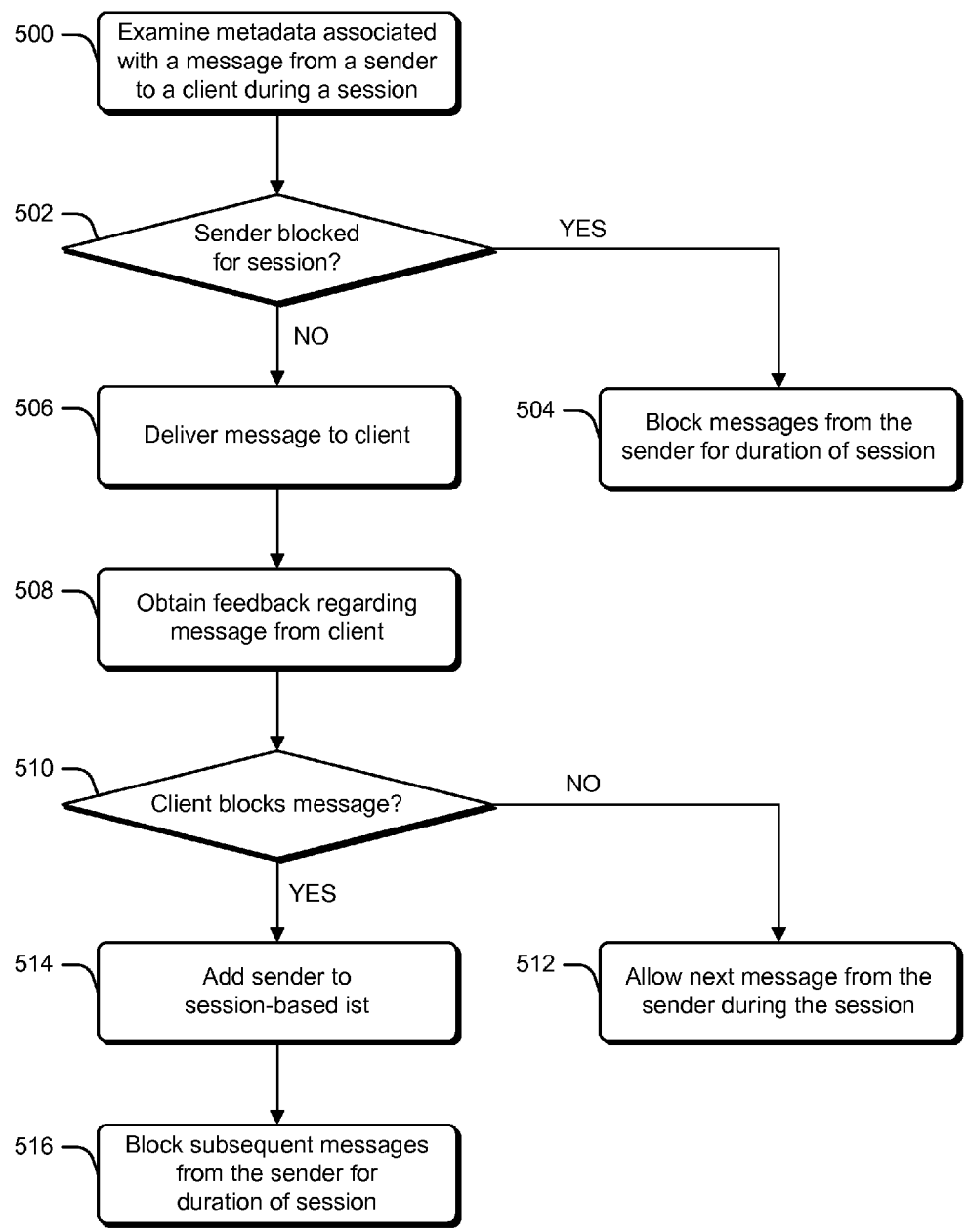
FIG. 5 is a flow diagram that describes steps of a method in accordance with one or more embodiments.

FIG. 5 is a flow diagram that describes steps of a method in accordance with one or more embodiments. In particular, FIG. 5 illustrates an example procedure in which messages from a sender can be selectively blocked at a server based on the identity of a sender. Naturally, various other filtering criteria can also be used to filter messages in a comparable manner. The method can be implemented in connection with any suitable hardware, software, firmware, or combination thereof. In at least some embodiments, the method can be implemented by way of a suitability configured computing device, such as the example service provider 114 of FIG. 1 that includes or otherwise makes use of messaging service 128 and/or session-based lists 132.

Step 500 examines metadata associated with a message from a sender to a client during a session. For example, incoming messages from a sender for delivery to a client can be examined to identify a sender of the message. The sender can be a particular person, a domain, a corporate entity, or other sender. Metadata can also be examined to determine other characteristics of the message, such as content type, keywords, inclusion of attachments or script, and so forth.

Step 502 determines whether the sender has been blocked for the session. For example, the identity of the sender determined in step 500 can be compared to entries in a session-based list 132 corresponding to the client to determine if an entry for the sender is included in the list. As noted a session-based list can be configured as a block list or an allow list. For the purpose of example, assume that the session-based list 132 here is a block list. In this case, inclusion of the sender on the list indicates that messages from the sender are blocked and should not be delivered to the client. Likewise, inclusion of the sender on an allow list indicates that messages from the sender are allowed and can be delivered to the client.

Accordingly, when the sender is included on the block list, step 504 blocks messages from the sender for the duration of the session. Otherwise, when the sender is not blocked, step 506 delivers the message to the client.

In this case, the client can be configured to implement its own techniques for message filtering in any suitable way and apply the techniques to messages that make it through the server. Moreover, the client can provide feedback on filtering decisions in the form of state data as previously described.

When the client communicates such feedback for a message back to the service provider, step 508 obtains the feedback and can process the feedback to determine how the message was handled by the client. In particular, step 510 determines, based on the feedback, whether the message was blocked or allowed by the client. For instance, the feedback can indicate that the message was blocked based on the identity of the sender. Alternatively, the feedback can indicate that the sender is approved or simply that the message was allowed at the client.

If the client approves the sender or otherwise allows the message, step 512 allows the next message sent by the sender during the session. In this case, the sender can remain off of a block list or be added to an allow list. On the other hand, if the message is blocked, step 514 adds the sender to the session-based list that is configured as a block list per the preceding example. Then, the session-based list is used on the server-side to handle filtering for subsequent messages. Assuming another message from the same sender is received during the session, the session-based list can be referenced and step 516 blocks subsequent messages from the sender during the session based upon inclusion of the sender on the session-based list.

As noted, various kinds of criteria other than just sender identity can also be used to filter messages as described above and below. If the instead of blocking or allowing messages based on the sender identity, particular criteria are applied to make filtering determinations for messages, the session-based list can be configured to reflect the criteria that are used by a client for filtering decisions. This causes subsequent messages that match the criteria to be blocked or allowed at the server as appropriate for the duration of the session.

Having considered various example methods for session-based filtering, consider now an example system that can be employed to implement various aspects of session-based filtering in accordance with one or more embodiments.

Example System

Figure 6:
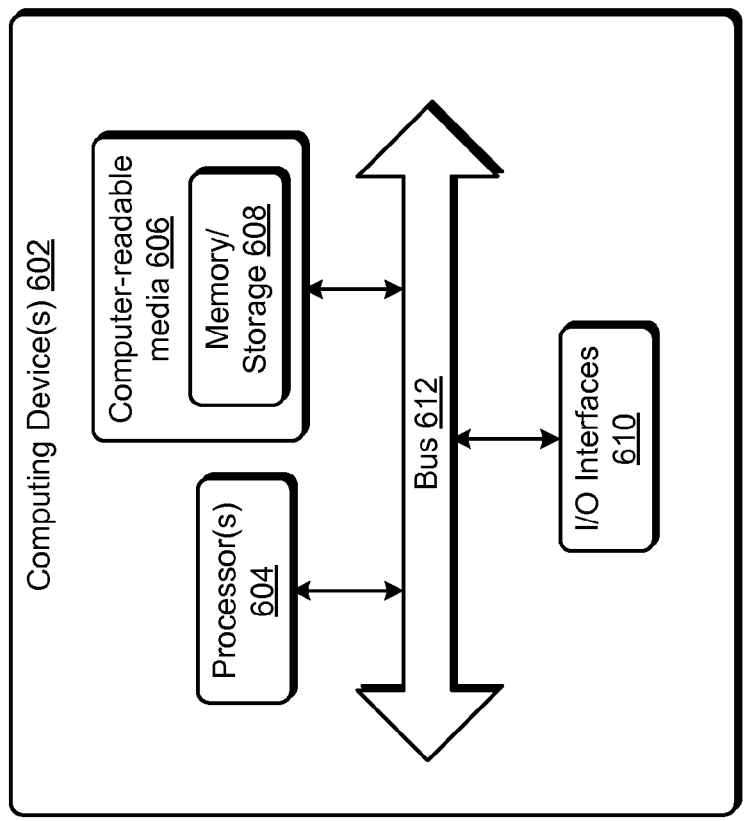
FIG. 6 illustrates an example system that can be used to implement one or more embodiments.

FIG. 6 illustrates an example system generally at 600 that includes an example computing device 602 that is representative of one or more such computing systems and/or devices that can implement the various embodiments described above. The computing device 602 may be, for example, a server of a service provider 114, a device associated with the client 102, an on-chip system, and/or any other suitable computing device or computing system.

The example computing device 602 includes one or more processors 604 or processing units, one or more computer-readable media 606 which can include one or more memory and/or storage components 608, one or more input/output (I/O) interfaces 610 for input/output (I/O) devices, and a bus 612 that allows the various components and devices to communicate one to another. Computer-readable media 606 and/or one or more I/O devices can be included as part of, or alternatively may be coupled to, the computing device 602. The bus 612 represents one or more of several types of bus structures, including a memory bus or memory controller, a peripheral bus, an accelerated graphics port, and a processor or local bus using any of a variety of bus architectures. The bus 612 can include wired and/or wireless buses.

The memory/storage component 608 represents one or more computer-readable media. The memory/storage component 606 can include volatile media (such as random access memory (RAM)) and/or nonvolatile media (such as read only memory (ROM), Flash memory, optical disks, magnetic disks, and so forth). The memory/storage component 608 may include fixed media (e.g., RAM, ROM, a fixed hard drive, etc.) as well as removable media (e.g., a Flash memory drive, a removable hard drive, an optical disk, and so forth).

Input/output interface(s) 610 allow a user to enter commands and information to computing device 602, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may comprise "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that can be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media can include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of a integrated circuit or chip, or other storage device, tangible media, or article of manufacture suitable to store the desired information and which may be accessed by a computer.

"Communication media" can refer to a signal bearing medium that is configured to transmit instructions to the hardware of the computing device, such as via the network 112. Communication media typically can embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the communication module 110, message filter 111, resource manager 120, and other program modules, may be embodied as one or more instructions and/or logic embodied on some form of computer-readable media.

Accordingly, particular modules, functionality, components, and techniques described herein can be implemented in software, hardware, firmware and/or combinations thereof. The computing device 602 may be configured to implement particular instructions and/or functions corresponding to the software and/or hardware modules implemented on computer-readable media. The instructions and/or functions can be executable/operable by one or more articles of manufacture (for example, one or more computing devices 602 and/or processors 604) to implement techniques for session-based filtering, as well as other techniques. Such techniques include, but are not limited to, the example procedures described herein. Thus, computer-readable media can be configured to store or otherwise provide instructions that, when executed by one or more devices described herein, cause various techniques for session-based filtering.

CONCLUSION

Various embodiments provide session-based filtering designed to implement message filtering in a cooperative manner between a client and a service provider. A service provider can obtain feedback from the client indicative of one or more delivered messages that have been filtered at the client according to client designated criteria. The service provider can dynamically create a session-based list for the client based on the feedback and use the list for the duration of the session to filter messages on the server-side with the client designated criteria. When the session concludes, the session-based list can be discarded to avoid costs associated with storing and maintaining filtering criteria for clients at the service provider.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage media storing instructions, that when executed by a computing device, cause the computing device to implement a messaging service configured to perform acts comprising:
    establishing a messaging session with a client;
    passing through messages from a service provider at a server-side to the client at a client-side over a network without filtering at the server-side;
    obtaining feedback in the form of filter state data communicated during the messaging session from the client to the messaging service, the filter state data indicating filtering criteria applied during the messaging session by the client to filter messages at the client-side;
    dynamically creating a session-based list for use by the messaging service during the session based on the feedback from the client that incorporates the filtering criteria applied at the client-side, wherein the messaging service configured to create different session-based lists on demand for individual sessions with clients that are discarded at the conclusion of the individual sessions to avoid persistent storage of filter criteria for the clients by the service provider at the server-side;
    using the session-based list for a duration of the messaging session to filter messages on the server-side using the filtering criteria applied at the client-side; and
    discarding the session-based list when the messaging session concludes.

2. The one or more computer-readable storage media of claim 1, wherein the messages comprise e-mail messages.

3. The one or more computer-readable storage media of claim 1, wherein the messages comprise instant messaging messages.

4. The one or more computer-readable storage media of claim 1, wherein the filtering criteria are configured to filter messages based upon identities of senders of the messages.

5. The one or more computer-readable storage media of claim 1, wherein the filtering criteria are configured to filter messages based upon content of the messages.

6. The one or more computer-readable storage media of claim 1, wherein the messaging service is further configured to perform acts comprising:
    delivering a first message from a particular sender to the client during the messaging session;
    selectively blocking or allowing subsequent messages from the particular sender at the server-side during the messaging session in accordance with the feedback obtained from the client, wherein the feedback describes whether the first message was blocked or allowed at the client-side by the client.

7. The one or more computer-readable storage media of claim 1, wherein the messaging service is configured to provide the client multiple different types of messaging.

8. The one or more computer-readable storage media of claim 1, wherein the session-based list comprises a block list that designates filter criteria to be used by the service provider to block messages on the server-side including blocking messages from particular senders based on identities of the senders.

9. A system comprising:
    one or more processors; and
    one or more computer-readable media having stored thereon computer-executable instructions that are executable by the one or more processors to implement a messaging service configured to perform acts including:
        establishing a messaging session with a client;
        passing through messages from a service provider at a server-side to the client at a client-side over a network without filtering at the server-side;
        obtaining feedback in the form of filter state data communicated during the messaging session from the client to the messaging service, the filter state data indicating filtering criteria applied during the messaging session by the client to filter messages at the client-side;
        dynamically creating a session-based list for use by the messaging service during the session based on the feedback from the client that incorporates the filtering criteria applied at the client-side, wherein the messaging service configured to create different session-based lists on demand for individual sessions with clients that are discarded at the conclusion of the individual sessions to avoid persistent storage of filter criteria for the clients by the service provider at the server-side;
        using the session-based list for a duration of the messaging session to filter messages on the server-side using the filtering criteria applied at the client-side; and
        discarding the session-based list when the messaging session concludes.

10. The system of claim 9, wherein the messages comprise e-mail messages.

11. The system of claim 9, wherein the messages comprise instant messaging messages.

12. The system of claim 9, wherein the filtering criteria are configured to filter messages based upon identities of senders of the messages.

13. The system of claim 9, wherein the filtering criteria are configured to filter messages based upon content of the messages.

14. The system of claim 9, wherein the messaging service is further configured to perform acts comprising:
    delivering a first message from a particular sender to the client during the messaging session;

selectively blocking or allowing subsequent messages from the particular sender at the server-side during the messaging session in accordance with the feedback obtained from the client, wherein the feedback describes.

15. The system of claim 9, wherein the messaging service is configured to provide the client multiple different types of messaging.

16. The system of claim 9, wherein the session-based list comprises a block list that designates filter criteria to be used by the service provider to block messages on the server-side including blocking messages from particular senders based on identities of the senders.

17. A method to implement a messaging service comprising:
   establishing a messaging session with a client;
   passing through messages from a service provider at a server-side to the client at a client-side over a network without filtering at the server-side;
   obtaining feedback in the form of filter state data communicated during the messaging session from the client to the messaging service, the filter state data indicating filtering criteria applied during the messaging session by the client to filter messages at the client-side;
   dynamically creating a session-based list for use by the messaging service during the session based on the feedback from the client that incorporates the filtering criteria applied at the client-side, wherein the messaging service configured to create different session-based lists on demand for individual sessions with clients that are discarded at the conclusion of the individual sessions to avoid persistent storage of filter criteria for the clients by the service provider at the server-side;
   using the session-based list for a duration of the messaging session to filter messages on the server-side using the filtering criteria applied at the client-side; and
   discarding the session-based list when the messaging session concludes.

18. The method of claim 17, wherein the messaging service is further configured to perform acts comprising:
   delivering a first message from a particular sender to the client during the messaging session;
   selectively blocking or allowing subsequent messages from the particular sender at the server-side during the messaging session in accordance with the feedback obtained from the client, wherein the feedback describes whether the first message was blocked or allowed at the client-side by the client.

19. The method of claim 17, wherein the messaging service is configured to provide the client multiple different types of messaging.

20. The method of claim 17, wherein the session-based list comprises a block list that designates filter criteria to be used by the service provider to block messages on the server-side including blocking messages from particular senders based on identities of the senders.

* * * * *